United States Patent [19]

Sakurai

[11] Patent Number: 4,653,619
[45] Date of Patent: Mar. 31, 1987

[54] CLUTCH RELEASED BRAKE HOLDER FOR MOTOR VEHICLE

[75] Inventor: Ushio Sakurai, Hiroshima, Japan

[73] Assignee: Mazda Motor Corporation, Hiroshima, Japan

[21] Appl. No.: 753,230

[22] Filed: Jul. 9, 1985

[30] Foreign Application Priority Data

Jul. 11, 1984 [JP] Japan ............................ 59-105432[U]
Jul. 13, 1984 [JP] Japan ............................ 59-107030[U]
Aug. 20, 1984 [JP] Japan ............................ 59-126508[U]

[51] Int. Cl.⁴ ............................................. B60K 41/24
[52] U.S. Cl. ................................................. 192/13 A
[58] Field of Search .................... 192/13 A, 13 R, 4 A, 192/3 H, 3 TR

[56] References Cited

U.S. PATENT DOCUMENTS

| | | | |
|---|---|---|---|
| 1,927,209 | 9/1933 | Gilmore | 192/13 A X |
| 2,036,700 | 4/1936 | Johnson | 192/13 A |
| 2,061,081 | 11/1936 | Lloyd | 192/13 A |
| 2,135,897 | 11/1938 | Jameson | 192/13 A |
| 4,540,072 | 9/1985 | Suzuki et al. | 192/3 H |

FOREIGN PATENT DOCUMENTS 51-43526 4/1976 Japan .

Primary Examiner—George H. Krizmanich
Attorney, Agent, or Firm—Burns, Doane, Swecker & Mathis

[57] ABSTRACT

A stop-state retaining arrangement for use in a motor vehicle, which includes a brake pedal for applying a braking force to wheels when depressed by a treading force, a clutch pedal for disengaging a clutch when depressed by a treading force, a cable connected, at its one end, to the clutch pedal, and a depressed stroke position holding mechanism connected to the other end of the cable, and arranged to be actuated to hold the brake pedal at the depressed stroke position upon depression of the clutch pedal, and to relieve the brake pedal from the holding at the depressed stroke position upon releasing the clutch pedal from the depression.

6 Claims, 10 Drawing Figures

CLUTCH RELEASED BRAKE HOLDER FOR MOTOR VEHICLE

BACKGROUND OF THE INVENTION

The present invention generally relates to a motor vehicle and more particularly, to a stop-state retaining arrangement for use in a motor vehicle, which is adapted to retain a foot-operated brake pedal of the motor vehicle at a depressed position in a depression stroke thereof.

Commonly, when a motor vehicle is to be advanced on a sloping road, it has been required to start the motor vehicle by properly depressing three foot-operated pedals, i.e., accelerator pedal, clutch pedal and brake pedal, but such an operation is generally difficult, calling for some experience on the part of a driver. Therefore, a hand-brake has been utilized in place of the brake pedal. In this case, however, for a driver not accustomed to operations in starting on sloping roads, there has been a possibility that, even if the hand brake is utilized, the motor vehicle does not successfully advance, but is undesirably retreated against the intention.

In order to eliminate such an inconvenience as described above, it may be so arranged, for example, to automatically hold the brake pedal at its depressed position during advancing on a slope for retaining wheels of the motor vehicle in a brake-applied state or to automatically release the brake pedal and wheels from such state.

As one example of a stop-state retaining device as referred to above, there has conventionally been proposed an arrangement in which, with ratchet teeth being provided at a head portion of a brake pedal, a solenoid is controlled through energization by signals of a vehicle speed sensor and an accelerator switch so as to drive a ratchet pawl which engages the ratchet teeth, thereby to automatically retain or release the brake pedal.

However, the above known arrangement adopts an electrical control, and therefore, the control becomes very complicated, while moreover, since said arrangement is intended to be normally mounted on a so-called "automatic" motor vehicle, it can not be applied, as it is, to a so-called "manual" motor vehicle having a clutch pedal.

Incidentally, upon consideration of the operation during advancing on a sloping road for the "manual" motor vehicle, when the brake pedal is depressed and the wheels are braked, the clutch pedal is also depressed, with the clutch disengaged, while, as the clutch pedal is gradually released from the depression so as to be in a state of so-called half-clutch, the brake pedal is loosened to release the wheels from braking for enabling the motor vehicle to advance.

Accordingly, in a "manual" motor vehicle, as a method for automatically retaining or releasing the brake pedal in the manner as described above, it may be considered to associate the brake pedal and the clutch pedal with each other. Moreover, in the above case, if it is so arranged that the position of the clutch pedal at which the brake pedal is released, is adjustable according to gradients of sloping roads, a smoother advancing on such slopes may be expected.

SUMMARY OF THE INVENTION

Accordingly, an essential object of the present invention is to provide an improved stop-state retaining arrangement for a motor vehicle, which enables a motor vehicle having a clutch pedal to smoothly and positively start on sloping roads at all times, irrespective of gradients of the sloping roads.

Another important object of the present invention is to provide a stop-state retaining arrangement of the above described type, which is so adapted that, by arranging to retain or release a brake pedal at or from a depressed position in the depression stroke, in association with the operation of a clutch pedal, the motor vehicle can readily start on a sloping road without the use of a hand brake, while depending on necessity, the function to effect the above retaining and releasing of the brake pedal may be made inoperative.

A further object of the present invention is to provide a stop-state retaining arrangement of the above described type, which is simple in construction and stable in operation, and may be easily incorporated into motor vehicles at low cost.

In accomplishing these and other objects, according to one preferred embodiment of the present invention, there is provided a stop-state retaining arrangement for use in a motor vehicle, which includes a brake pedal for applying a braking force to wheels when depressed by a treading force, a clutch pedal for disengaging a clutch when depressed by a treading force, a cable connected, at its one end, to said clutch pedal, and a depressed stroke position holding mechanism connected to the other end of said cable, and arranged to be actuated to hold said brake pedal at the depressed stroke position upon depression of the clutch pedal, and to relieve said brake pedal from the holding at the depressed stroke position upon releasing said clutch pedal from the depression.

More specifically, the above stop-state retaining arrangement of the present invention is so constructed that, to the other end of the cable connected at its one end to the clutch pedal, the depressed brake pedal position or depressed stroke position holding mechanism is coupled, while a connection/disconnection changeover mechanism for effecting connection and disconnection between the clutch pedal and the cable, is associated with a connecting portion therebetween, and thus, by the above depressed stroke position holding mechanism, the brake pedal is held at the depressed stroke position when the clutch pedal is depressed, and is relieved from the holding at the depressed stroke position upon releasing said clutch pedal from the depression.

By the arrangement of the present invention as described above, an improved stop-state retaining arrangement for a motor vehicle has been advantageously presented through simple construction.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Referring now to the drawings, there is shown, in FIGS. 1 through 7, a stop-state retaining arrangement RA according to one preferred embodiment of the present invention.

Figure 2:
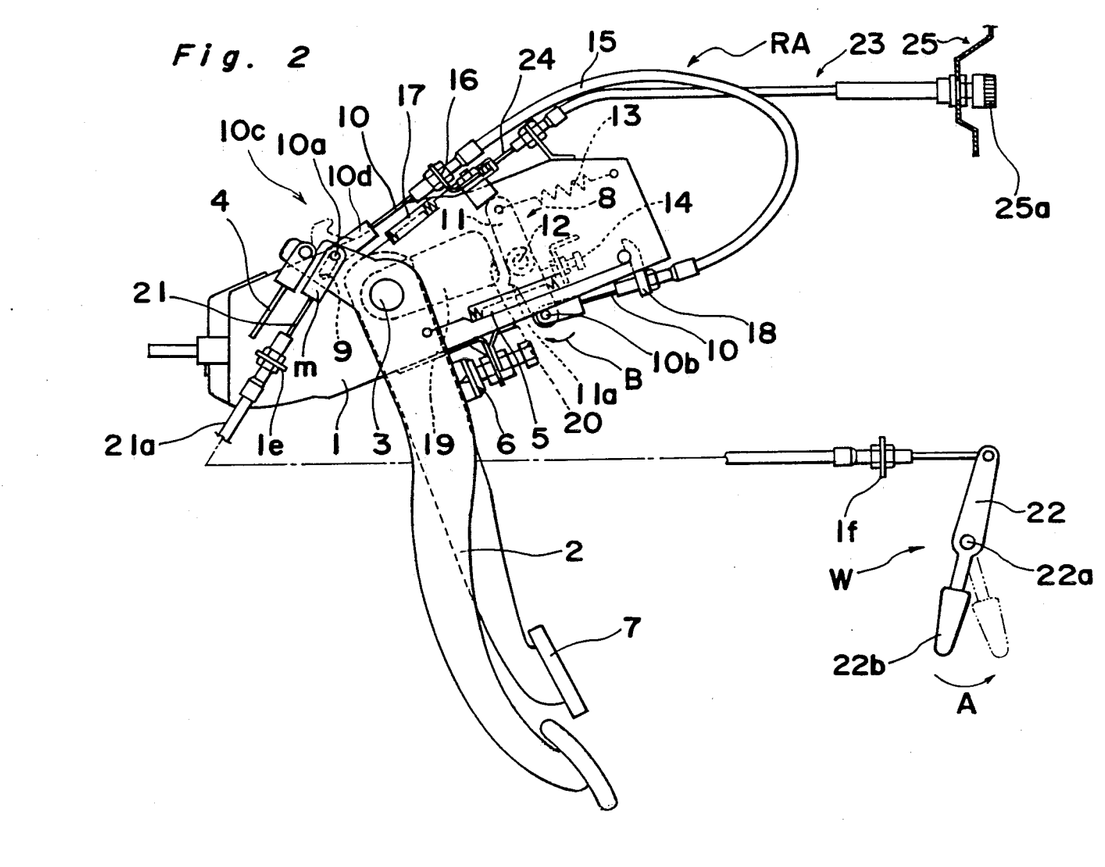
FIG. 2 is a schematic side elevational view, partly in section, showing the construction of the stop-state retaining arrangement of FIG. 1.

With particular reference to FIG. 2, the stop-state retaining arrangement RA is so constructed that a foot-operated clutch pedal 2 is pivotally connected for rotation about a shaft 3, on a support panel 1 provided at the front portion of a driver's seat within a cab (not shown), while said clutch pedal 2 is connected to a clutch mechanism (not particularly shown) through a clutch operating cable 4 so as to disengage the clutch upon depression of said clutch pedal 2 by a treading force. Between the clutch pedal 2 and the support panel 1, there is provided a spring 5 for urging the clutch pedal 2 in a direction opposite to the depressing direction, with a stopper 6 for restricting the returning position of the clutch pedal 2 being fixed to said support panel 1. Moreover, a brake pedal 7 is pivotally connected to the support panel 1 for rotation about the shaft so as to apply a braking force to wheels (not shown) of the motor vehicle when depressed by a treading force.

The stop-state retaining arrangement RA of the present invention is provided with a depressed brake pedal position or depressed stroke position holding mechanism 8 provided between the clutch pedal 2 and the brake pedal 7, and arranged to hold the brake pedal 7 at its depressed stroke position and to relieve said brake pedal 7 from the holding at the depressed stroke position according to the operation of the clutch pedal 2, and a connection/disconnection change-over mechanism W provided for a connecting portion 10c between the clutch pedal 2 and a cable 10 for effecting connection and disconnection therebetween. More specifically, to the upper portion of the clutch pedal 2, one end of the cable 10 is connected through the connecting portion 10c, while, to the other end of the cable 10, the depressed stroke position holding mechanism 8 is coupled.

More specifically, the connecting portion 10c includes an arcuate elongated opening 9 formed above the shaft 3 on the clutch pedal 2, about said shaft 3 as a center, a pin 10a loosely fitted in said arcuate opening 9, and a metal piece 10d connected to this pin 10a and also to the one end of the cable 10.

Figure 6:
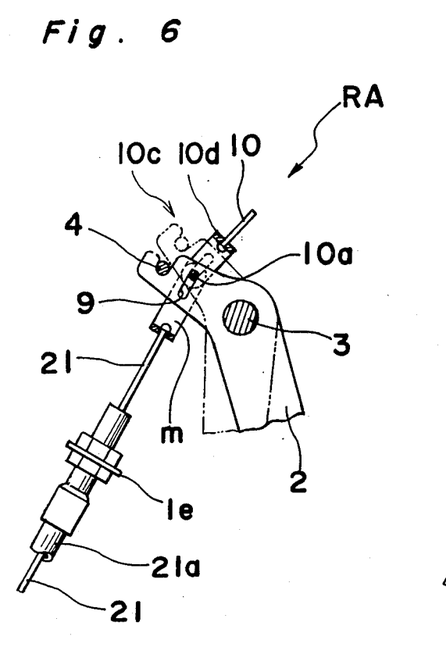
FIGS. 6 and 7 are fragmentary side elevational views showing, on an enlarged scale, another essential portion of the arrangement of FIG. 2.
Figure 7:
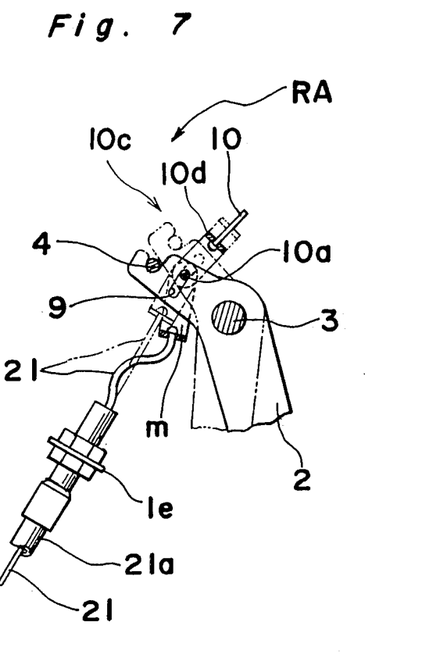

Referring also to FIGS. 6 and 7, the connection/disconnection change-over mechanism W further includes an end metal piece m supported at its one end by the pin 10a movably fitted in the arcuate opening 9 formed in the upper portion of the clutch pedal 2, and connected at its other end, to the one end of a regulating cable 21, a guide flexible tube 21a fixed at its one end, to a side bracket 1e integral with the support panel 1 and at its other end, to a bracket if provided at a suitable position of the vehicle body for guiding the regulating cable 21, and an operating lever 22 pivotally connected by a shaft 22a at a suitable portion of the driver's seat for rocking movement. The lower portion of this operating lever 22 is formed into a grip portion 22b, with a tension spring (not shown) for snap action of the lever 22 being connected between a suitable portion of the driver's seat and said lever 22, while the other end of the regulating cable 21 is connected to the upper end of the operating lever 22.

Figure 5:
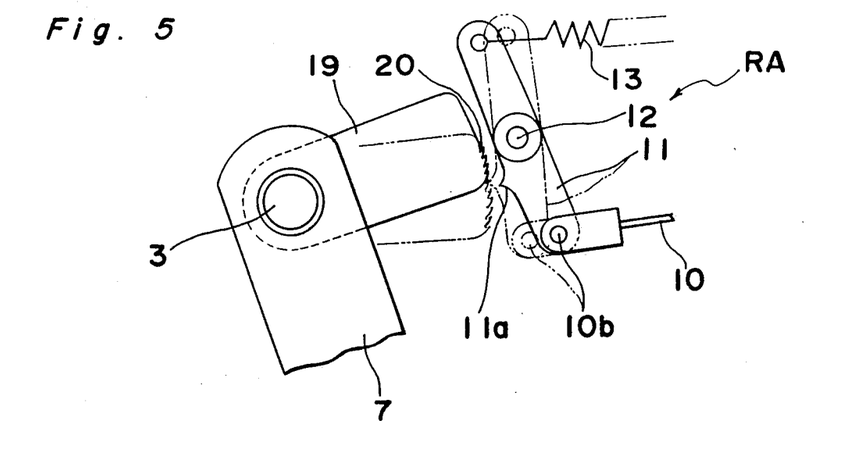
FIG. 5 is a fragmentary side elevational view showing, on an enlarged scale, an essential portion of the arrangement of FIG. 2.

Referring also to FIG. 5, as referred to above, in the depressed stroke position holding mechanism 8, the one end of the cable 10 is connected to the upper portion of the clutch pedal 2 by inserting the connecting pin 10a of the metal piece 10d for the cable 10 in the elongated opening 9 formed in said upper portion, while a rocking arm 11 having a ratchet pawl 11a is pivotally connected to the support panel 1 for rotation about a shaft 12, and to the lower end of said rocking arm 11, the other end of the cable 10 is connected through a connecting pin 10b. Between the upper end of the rocking arm 11 and the support panel 1, a spring 13 is connected so as to urge the rocking arm 11 for the pivotal movement, with a stopper 14 (FIG. 2) being provided on the support panel 1 for restricting the rotating position of the rocking arm 11.

The cable 10 referred to above is passed through a guide tube 15, whose one end is fixed to an upper fixing bracket 16 which is pivotally connected to said support panel 1 so as to be urged for rotation by a spring 17. On the other hand, the other end of the guide tube 15 is secured to the lower fixing bracket 18 fixed to said support panel 1.

Moreover, the brake pedal 7 is provided with a rotary member or sector plate 19 adapted to rotate in one unit therewith, and formed with ratchet teeth 20 in its one outer edge, with said ratchet teeth 20 being arranged to be engaged with or disengaged from the ratchet pawl 11a according to the rocking positions of the rocking arm 11.

As described so far, the depressed brake pedal position or depressed stroke position holding mechanism 8 is arranged to be actuated upon depression of the clutch pedal 2 so as to hold the brake pedal 7 at the depressed position, and to release said brake pedal 7 from the holding at the depressed position when said clutch pedal 2 is returned to a predetermined stroke position from the depressed position.

The ratchet teeth 20 formed in the outer edge of the sector plate 19 are in the form of saw-teeth directed in a direction in which they will not be disengaged from the ratchet pawl 11a even if a force for returning the depression of the brake pedal 7 is applied during the engagement therebetween. More specifically, the portion of the outer peripheral edge of the sector plate 19 at which said ratchet teeth 20 are formed, is in a range in which said ratchet teeth 20 engage the ratchet pawl 11a within a rotational angle in which the brake is applied in a normal range upon depression of the brake pedal 7 (i.e., in the range extending along approximately a lower half of the outer peripheral edge of the sector plate 19 in FIG. 5), and the ratchet teeth 20 are not provided at the portion of said outer peripheral edge which confronts the ratchet pawl 11a in a state where the brake pedal 7 is fully depressed as in the application of a rapid braking. Meanwhile, when the clutch pedal 2 is not depressed, the ratchet teeth 20 are not engaged with the ratchet pawl 11a, and thus, the normal braking operation may be effected.

It should be noted here that, in the foregoing embodiment, although the separate sector plate 19 is described to be mounted onto the brake pedal 7 in one unit, such sector plate may be integrally formed with the brake pedal 7 by extending one portion of said pedal 7 outwardly.

Meanwhile, to the connecting pin 10a of the cable 10 for the clutch pedal 2 described earlier, the base end of the regulating cable 21 for restricting displacement of said connecting pin 10a is connected through the metal piece m, while the other end of said regulating cable 21 is connected to the operating lever 22 provided in the vicinity of the driver's seat, and the depressed stroke position holding mechanism 8 referred to earlier is adapted to be changed over between the operable state and the inoperable state by the operation of said operating lever 22.

Furthermore, the depressed stroke position holding mechanism 8 is further provided with an adjusting device 23 (FIGS. 1 and 2) which makes variable, the position of the clutch pedal 2 at which said brake pedal 7 is relieved from the holding at the depressed stroke position. In the above adjusting device 23, one end of an adjusting cable 24 is connected to the upper fixing bracket 16 to which one end of the guide tube 15 is fixed, while the other end of said adjusting cable 24 is connected to an adjusting knob mechanism 25 provided near the driver's seat. This adjusting knob mechanism 25 is so arranged that, when an adjusting knob 25a thereof is rotated in the clockwise direction (FIG. 3), the adjusting cable 24 is loosened, and the upper fixing bracket 16 is pivoted towards the clutch pedal 2 by the spring force of the spring 17, while upon turning of the adjusting knob 25a in the counterclockwise direction (FIG. 3), the cable 24 is stretched to rotate the upper fixing bracket 16 in a direction opposite to the clutch pedal 2.

By the above arrangement, for the operation, the operating lever 22 is first turned in the direction of the arrow A from the inoperative position shown in solid lines to the operative position shown in chain lines in FIG. 2 so as to loosen the tension of the regulating cable 21. Thus, upon depression of the brake pedal 7 on a sloping road, a braking force is applied to the wheels, and when the clutch pedal 2 is depressed, the clutch operating cable 4 is pulled to disengage the clutch, and consequently, the motor vehicle is stopped.

If it is required to actuate the depressed stroke position holding mechanism 8, when the operating lever 22 is turned counterclockwise as shown in the chain lines of Fig. 2, the regulating cable 21 is pushed to be partially bent as shown in FIG. 7. Upon depression of the clutch pedal 2 in the above state, the operating cable 21 becomes straight by its elasticity as shown in chain lines in FIG. 7, and thus, both the pin 10a and the cable 10 are depressed. Following the above function, the pin 10b of the rocking arm 11 is also pressed by the cable 10 for rocking, and the rocking arm 11 is rotated clockwise in FIG. 5 by the tension of the tension spring 13, while the sector plate 19 is also rotated clockwise upon depression of the brake pedal 7 as shown in chain lines in FIG. 5.

More specifically, since the ratchet pawl 11a is engaged with the ratchet teeth 20, the brake pedal 7 is not returned even when the foot is removed therefrom, and thus, the depressed pedal position or stroke position at that time may be retained.

Figure 1:
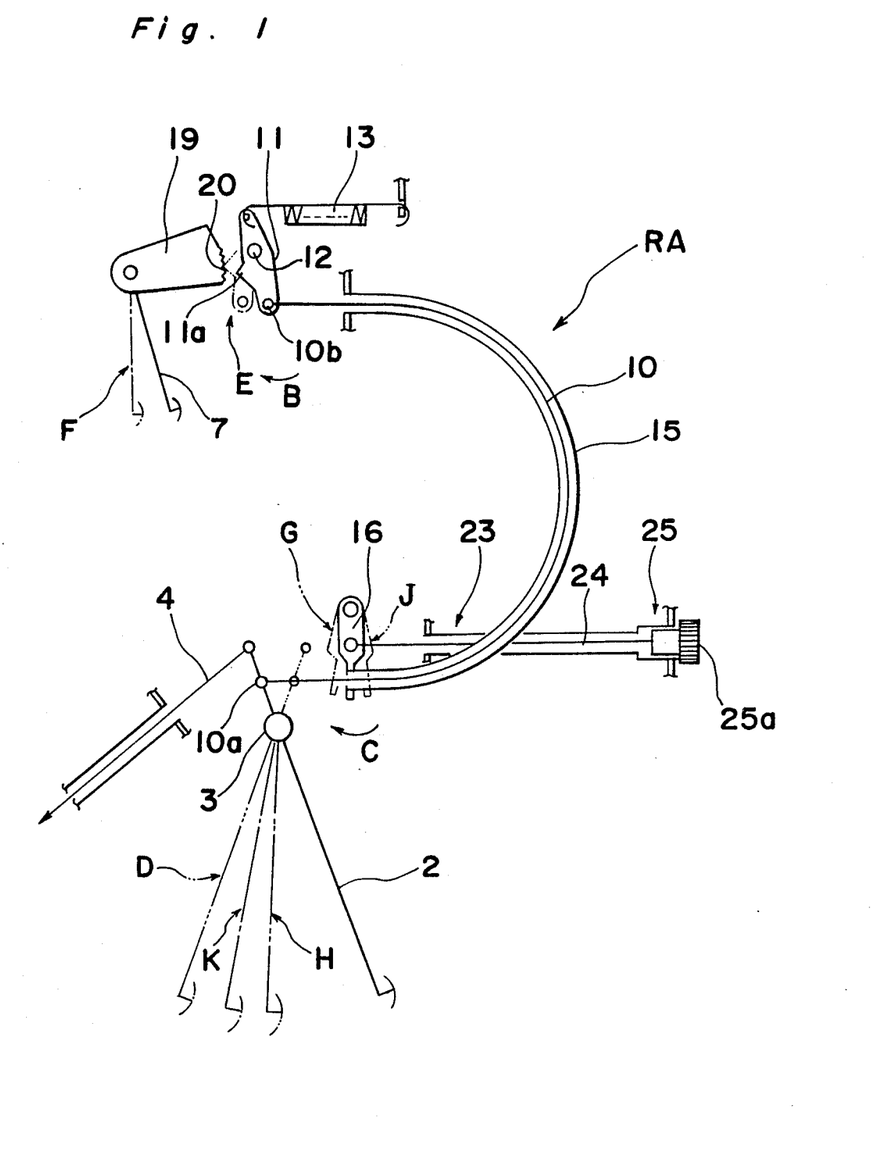
FIG. 1 is a schematic diagram explanatory of principle of a stop-state retaining arrangement according to one preferred embodiment of the present invention.

Thereafter, the accelerator pedal (not shown) is depressed, and in this case, according to the arrangement of the present invention, the tension of the cable 10 is loosened (D in FIG. 1) by the depression of the clutch pedal 2, and the rocking arm 11 is rocked in the direction of the arrow B by the spring force of the spring 13 for engagement between the ratchet pawl 11a and the ratchet teeth 20, whereby, the brake pedal 7 is retained at the depressed position during braking (E and F in FIG. 1). Therefore, even when the foot is removed from the brake pedal 7, said pedal 7 is not returned, and the motor vehicle is maintained at the stopped state.

Subsequently, for advancing the motor vehicle on this sloping road, the accelerator pedal (not shown) is depressed, while the clutch pedal 2 is gradually released from the depression, whereby the tension of the cable 10 is gradually increased by the returning of the clutch pedal 2, and when the clutch is brought into the so-called half-clutched state, the rocking arm 11 is pivoted by the tension of the cable 10 in a direction opposite to the direction of the arrow B against the spring force of the spring 13, and the ratchet pawl 11a is disengaged from the ratchet teeth 20, and thus, the brake pedal 7 is automatically relieved from the holding at the depressed position to release the wheels from the braking, thereby allowing the motor vehicle to advance.

Figure 3:
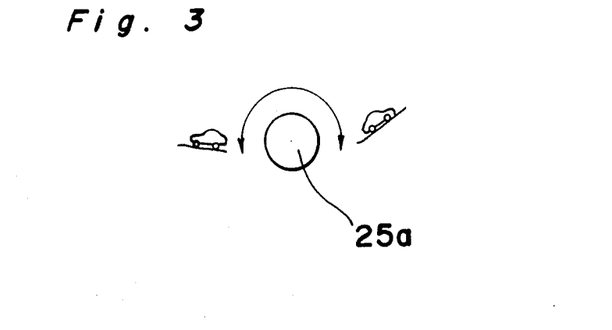
FIG. 3 is a diagram for explaining a function of an adjusting knob employed in the arrangement of FIG. 2.
Figure 4:
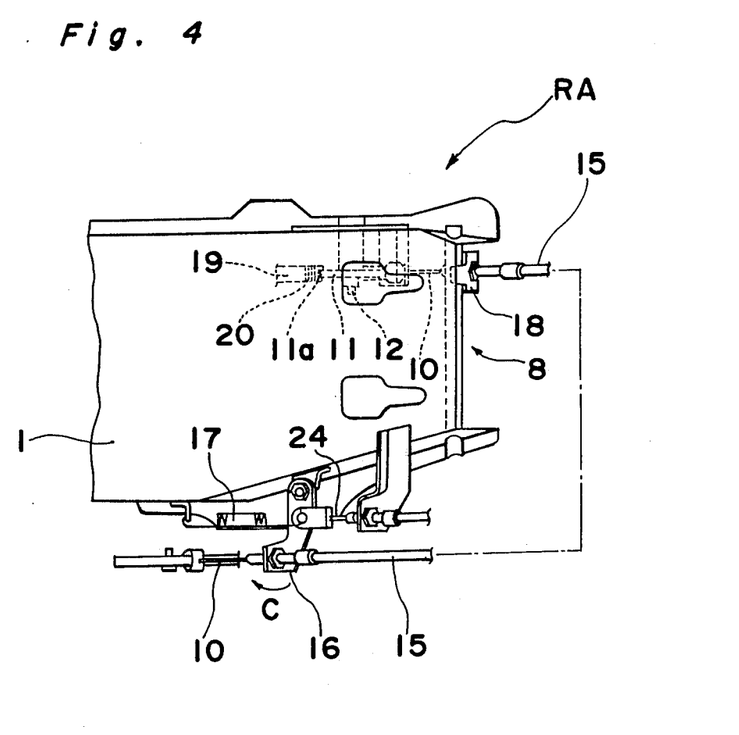
FIG. 4 is a fragmentary top plan view of the arrangement of FIG. 2.

In the above case, according to the arrangement of the present invention, the position of the clutch pedal 2 where the brake pedal 7 is relieved from the holding at the depressed position, may be adjusted as desired. More specifically, in the case where the sloping road has a steep gradient, the adjusting knob 25a is preliminarily turned clockwise as shown in FIG. 3. Then, the tension of the adjusting cable 24 is loosened, and the upper fixing bracket 16 is rotated in the direction of the arrow C (FIG. 1), thus increasing the amount of play or degree of looseness of the cable 10 (G in FIG. 1). In the above state, when the clutch pedal 2 has been fully returned for sufficient engagement of the clutch (H in FIG. 1), the rocking arm 11 is returned through the rocking motion, whereby the brake pedal 7 is to be released from the holding at the depressed position.

On the other hand, in the case where the sloping road has a gentle gradient, the control knob 25a is preliminarily turned counterclockwise as shown in FIG. 3. Then, the adjusting cable 24 is pulled to turn the upper portion fixing bracket 16 in a direction opposite to the direction indicated by the arrow C, whereby the degree of looseness of the cable 10 is reduced (J in FIG. 1). In this state, when the clutch pedal 2 has been returned to a certain extent, with the clutch being lightly engaged (K in FIG. 1), the rocking arm 11 is to be returned through rocking motion, and thus, the brake pedal 7 is to be released from the holding at the depressed position.

Meanwhile, when the above arrangement is not used, the operating lever 22 may be set at the inoperative position shown by the solid lines in FIG. 2, whereby the regulating cable 21 is pulled to maintain the cable 10 at a constant tension. Under the above state, even when the clutch pedal 2 is depressed for operation, since the tension of the cable 10 is constant, the rocking arm 11 is not pivoted in the direction in which the ratchet pawl 11a engages the ratchet teeth 20, and therefore, the holding mechanism 8 is maintained in the operative position.

It is to be noted here that the turning directions of the adjusting knob 25a may be modified to be opposite to those as described in the foregoing embodiment.

As described so far, according to the arrangement of the present invention, owing to the construction that the brake pedal 7 is held at the depressed stroke position or released therefrom in association with the operation of the clutch pedal 2, smooth and positive advancing of a "manual" motor vehicle on sloping roads has been made possible.

Moreover, in the above arrangement of the present invention, the position of the clutch pedal 2 at which the brake pedal 7 is released from the holding at the depressed position is adapted to be adjustable according to gradients of sloping roads, advancing on such sloping roads may be smoothly and positively effected at all times irrespective of the gradients of the sloping roads.

Furthermore, according to the arrangement of the present invention, since the control is effected mechanically, such control can be effected very easily through simple construction.

As is seen from the foregoing description, according to the present invention, it is so arranged that, in the motor vehicle having a clutch pedal, the brake pedal is provided with the depressed stroke position holding mechanism, while said holding mechanism and the clutch pedal are connected to each other through the cable so as to actuate the holding mechanism by the operation of the clutch pedal, with the position of the clutch pedal at which said holding mechanism is released being arranged to be adjustable by the adjusting device, and therefore, there is available such an effect that smooth and positive advancing on sloping roads may be achieved at all times irrespective of gradients of the sloping roads.

Figure 8:
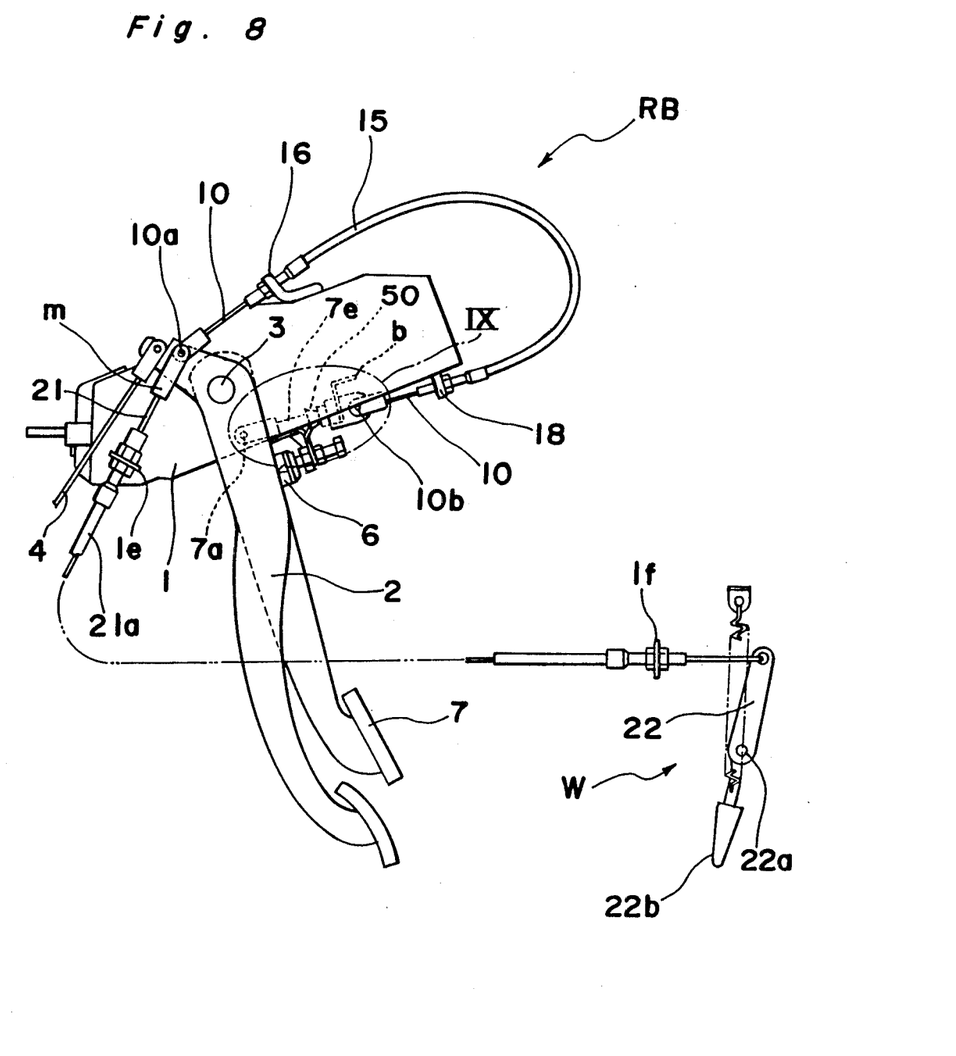
FIG. 8 is a view similar to FIG. 2, which particularly shows a modification thereof.
Figure 9:
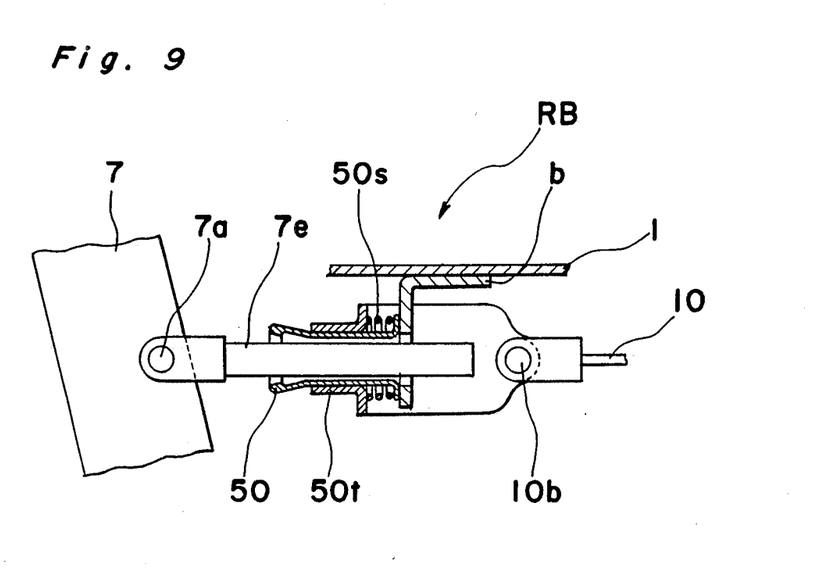
FIG. 9 is a fragmentary side elevational view showing, partly in section and on an enlarged scale, a portion surrounded by a chain line IX in FIG. 8.
Figure 10:
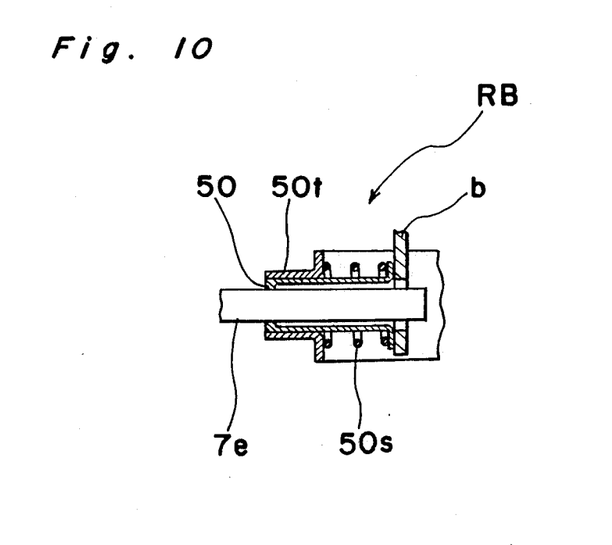
FIG. 10 is also a fragmentary side elevational view similar to FIG. 9 for particularly explaining the function thereof.

Referring further to FIGS. 8 through 10, there is shown a modification of the stop-state retaining arrangement as described with reference to FIGS. 1 through 7. The difference therebetween mainly related to the depressed stroke position holding mechanism 8 will be described hereinbelow, and in FIGS. 8 through 10, like parts in FIGS. 1 through 7 are designated by like reference numerals for brevity of description.

In the modified stop-state retaining arrangement RB of FIGS. 8 to 10, a collet member 50 is supported at its base end, by a bracket b fixed to the support panel 1, and between a sleeve member 50t surrounding the outer periphery of the collet member 50 and the base end of said collet member 50, a compression spring 50s is provided. Moreover, to the above sleeve member 50t, the other end of the cable 10 is connected by the pin 10b. On the other hand, to one portion of the brake pedal 7, a rod 7e is pivotally connected by a pin 7a, with the other end of said rod 7e being loosely fitted in the collet member 50. In the initial state of FIG. 8 in which neither the clutch pedal 2 nor brake pedal 7 is depressed, one end of the cable 10 is pulled, and the sleeve member 50t is also retreated by being pulled through the cable 10 as shown in FIG. 9, and thus, the compression spring 50s is brought into the compressed state, with the collet member 50 not functioning. Upon depression of the clutch pedal 2, the one end of the cable 10 is depressed, and the sleeve member 50t is moved to advance toward the forward end of the collet member 50 by the spring force of the compression spring 50s, and thus, the forward end portion of the collet member 50 is narrowed to grasp the rod 7e. In the manner as described above, the modified depressed stroke position holding mechanism for holding the brake pedal 7 in the depressed position is constituted.

Since other constructions and functions of the modified stop-state retaining arrangement RB of FIGS. 8 to 10 are generally similar to those of the arrangement RA of FIGS. 1 to 7, detailed description thereof is abbreviated for brevity.

It should be noted here that in the foregoing embodiments, although the one end of the cable 10 is connected to the portion higher than the shaft 3 for pivotally connecting the clutch pedal 2, such one end of the cable 10 may be connected to the portion lower than said shaft 3. In this case, of course, the cable 10 is pulled upon depression of the clutch pedal 2, and therefore, the depressed position holding mechanism must also be modified to a certain extent so as to be actuated when the cable 10 is pulled. Moreover, the pivotal operation of the operating lever 22 of the connection/disconnection change-over mechanism W may be modified to a push-pull operation on a straight line.

As described earlier, according to the present invention, the clutch pedal and the depressed stroke position holding mechanism are connected to each other by the cable so that the brake pedal is held at the depressed position upon depression of the clutch pedal, and is released from the holding at the depressed position when the clutch pedal is relieved from the depression, and therefore, advancing on sloping roads may be readily effected without requiring operation of the hand brake during stopping. Thus, the retaining arrangement of the present invention is convenient even for a beginner to operate, and furthermore, since the depressed stroke position holding mechanism may also be made inoperative by the connection/disconnection change-over mechanism, even a skilled driver can select either of the functions, while the arrangement according to the present invention is simple in construction and can be manufactured at low cost.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A stop-state retaining arrangement for use in a motor vehicle, which comprises a brake pedal for applying a braking force to wheels when depressed by a treading force, a clutch pedal for disengaging a clutch when depressed by a treading force, a cable connected, at one end, to said clutch pedal, and a braked state holding-releasing means including an engaging portion provided at an upper region of the brake pedal and a stopping portion connected to the other end of said cable, and actuatable to retain said brake pedal at the depressed stroke position by engagement of the stopping portion with said engaging portion upon depression of the clutch pedal, and to release said brake pedal from the depressed stroke position by disengagement of the stopping portion from the engaging portion upon releasing of said clutch pedal.

2. A stop-state retaining arrangment as claimed in claim 1, wherein said braked state holding-releasing means comprises ratchet teeth formed at the upper region of said brake pedal to define said engaging portion, and the stopping portion defined by a rocking arm having a ratchet pawl which engages the ratchet teeth and is pivotally connected at one end to a body portion of the motor vehicle for rotation by operation of the cable and a stop claw engageable with said ratchet pawl.

3. A stop-state retaining arrangement as claimed in claim 1, wherein said braked state holding-releasing means comprises a rod pivotally supported at a portion of the brake pedal and defining said engaging portion, the stopping portion including a collet member and a sleeve member, the collet member loosely fitted in the sleeve member, the other end of the cable connected to the sleeve member so that the collet member on said rod selectively grasps or releases said rod through operation of the cable.

4. A stop-state retaining arrangement as claimed in claim 1, including a connection/disconnection changeover mechanism comprising an operating lever, a pin movably fitted in an elongated opening formed in the clutch pedal, and a regulating cable connected, at one end, to the operating lever and at the other end, to said pin, said mechanism coupled with a connection between the clutch pedal and said cable for effecting connection and disconnection therebetween.

5. A stop-state retaining arrangement as claimed in claim 1, including an adjusting device comprising an adjusting knob, a bracket supporting a regulating cable pivotally connected, at one end for rotation, and an adjusting cable connected, at one end, to the adjusting knob and at the opposite end to said bracket for adjusting tension of the cable through pivotal movement of the bracket, said adjusting device varying the position of the clutch pedal at which said brake pedal is relieved from the retaining of the depressed stroke position.

6. A stop-state retaining arrangement as claimed in claim 1, including a connection/disconnection changeover mechanism and an adjusting device, the changeover mechanism comprising an operating lever, a pin movably fitted in an elongated opening formed in the clutch pedal, and a regulating cable connected at one end to the operating lever and at the other end to said pin, said mechanism coupled with a connection between the clutch pedal and said cable for effecting connection and disconnection therebetween; the adjusting device comprising an adjusting knob, a bracket supporting a regulating cable pivotably connected at one end to the adjusting knob and at the opposite end to said bracket for adjusting tension of the cable through pivotal movement of the bracket, said adjusting device varying the position of the clutch pedal at which said brake pedal is relieved from the retaining of the depressed stroke position.

* * * * *